United States Patent Office 3,207,389
Patented Sept. 21, 1965

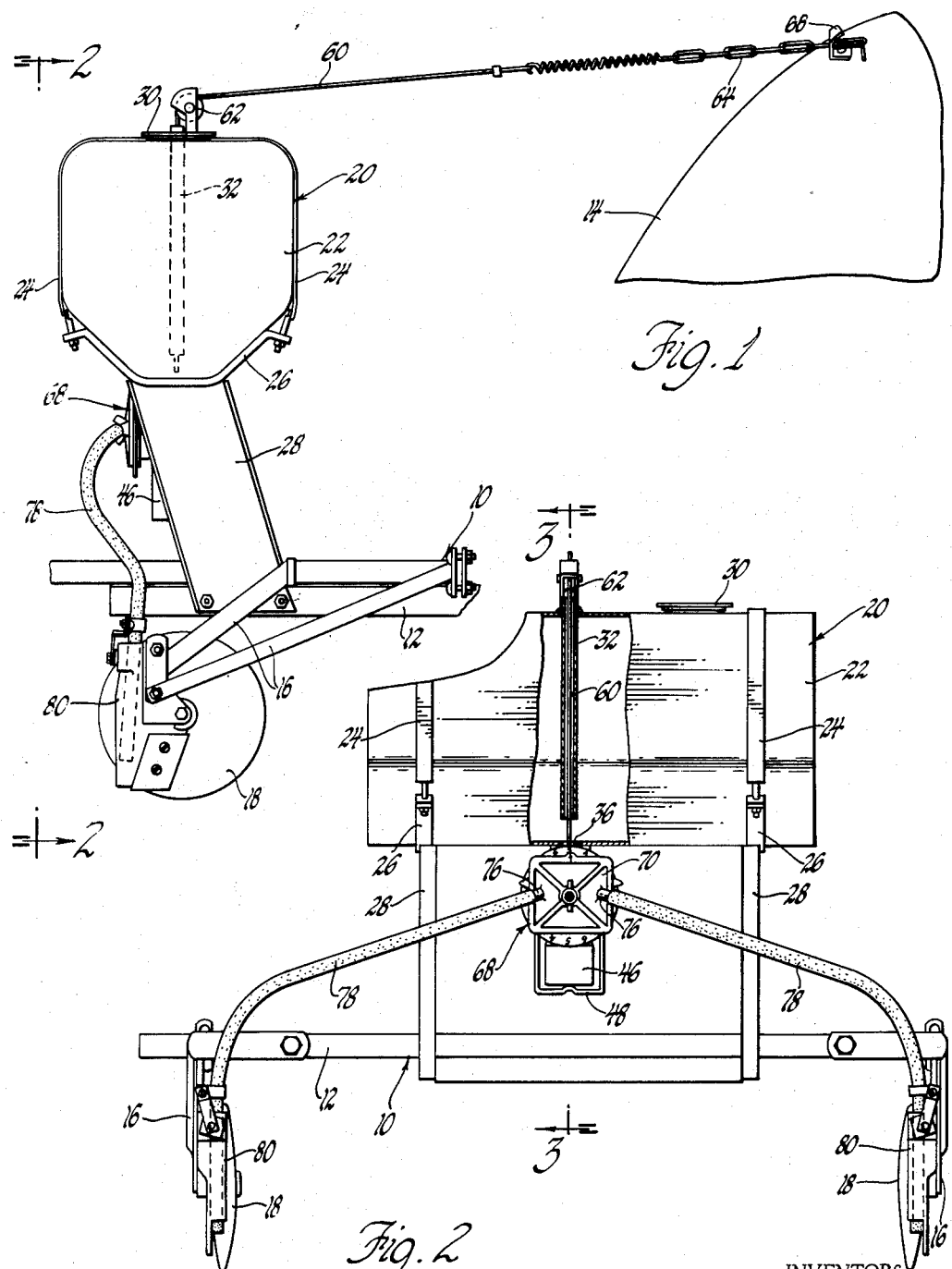

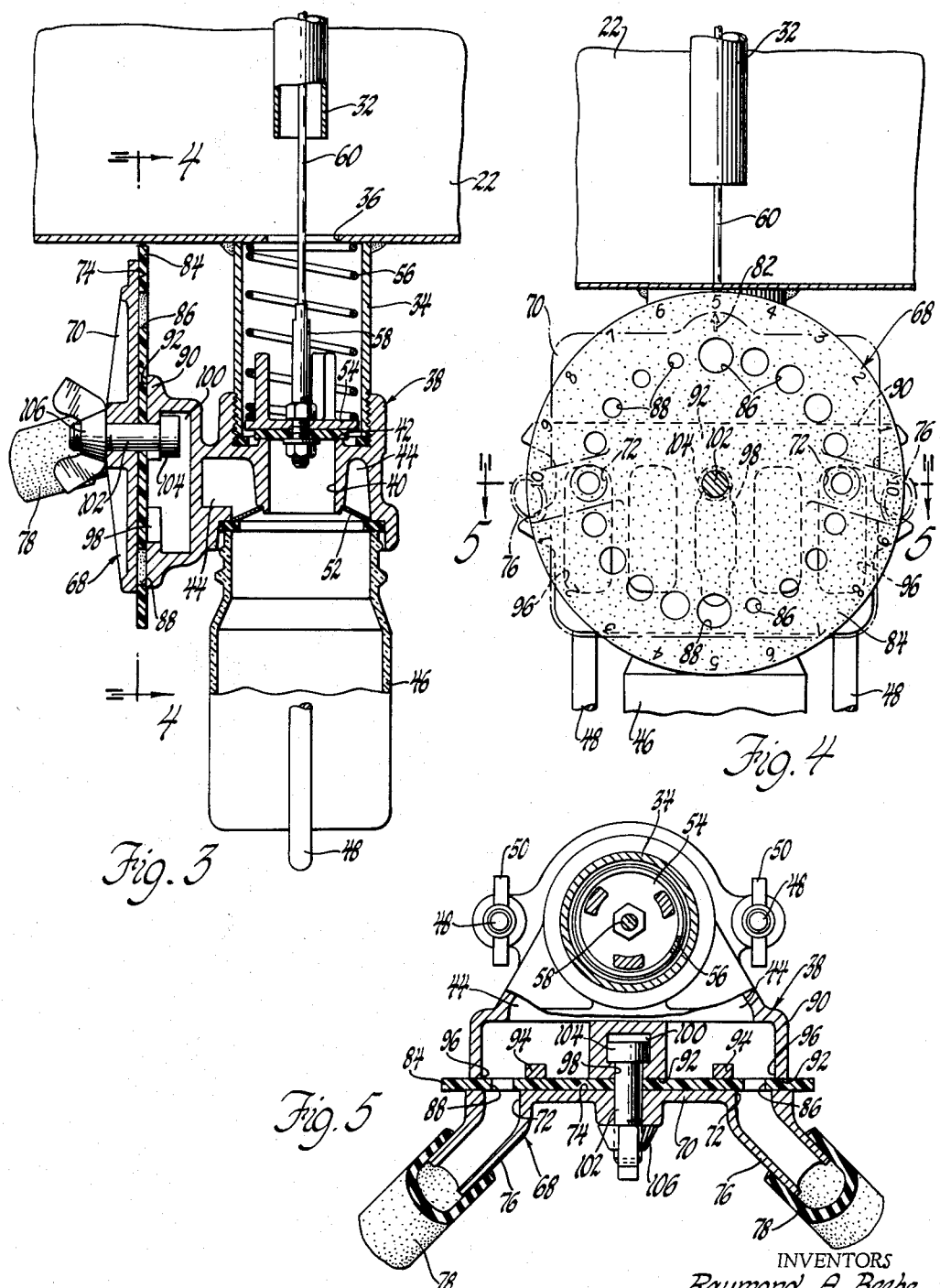

3,207,389
LIQUID FERTILIZER DISTRIBUTOR
Raymond A. Beebe, Detroit, and Ervin J. West, Novi,
Mich., assignors to Massey-Ferguson Inc., Detroit,
Mich., a corporation of Maryland
Filed Dec. 3, 1962, Ser. No. 241,793
17 Claims. (Cl. 222—486)

This invention relates to a liquid fertilizer distributing apparatus and, in particular, to such an apparatus particularly characterized by selectively adjustable metering means providing simultaneous variation within relatively wide limits of a controlled metered flow of liquid fertilizer to a plurality of fertilizer distributing outlets.

Liquid fertilizer distributing apparatus of the general type aforementioned are commonly employed on agricultural implements such as planters to selectively supply and distribute a metered flow of liquid fertilizer to the ground at a plurality of spaced points such as, for example, adjacent the press wheels or furrow openers of a planter, the number of which will vary depending upon the number of rows in the field being planted. More specifically, and referring to a planter by way of example, one distributing apparatus of the type aforementioned is commonly mounted on the planter frame carrying a suitable number of seed bins and adapted to be towed by an agricultural tractor, and comprises a tank for the liquid fertilizer, a plurality of individual conduit means each having one end thereof connected in flow relationship to the tank and the other ends thereof terminating in distributing outlets spaced along the planter frame respectively adjacent the press wheels or furrow openers carried by the planter frame, and a metering mechanism associated with each conduit for adjustably varying the rate of metered flow of fertilizer therethrough. Each metering mechanism typically comprises a selectively rotatably adjustable metering disk including a single series of metering orifices therethrough having progressively varying areas which may be selectively individually introduced in the flow path through the conduit to its distributing outlet to vary the rate of flow of fertilizer therethrough as desired or required. In this regard, the tank may be of the so-called "bottom-vented" type or otherwise adapted to supply liquid fertilizer therefrom through each of the individual metering mechanisms aforedescribed at a substantially constant pressure head whereby, of course, the rate of flow of the fertilizer through the respective conduits is determined substantially solely by the area of the metering orifice introduced in the flow path.

Thus, it may be noted that variation in the rate of flow of liquid fertilizer through the individual conduits of an apparatus of the type aforementioned is relatively limited as determined by the number of metering orifices provided in the metering disk of each metering mechanism. In addition, it will also be apparent that it is necessary to adjust the metering disk of each metering mechanism when varying the rate of flow of liquid fertilizer therethrough to insure that such rates among all the metering mechanisms are substantially equal under a given set of operating conditions and, as would be expected, it often happens that the operator of the apparatus inadvertently fails to adjust all of the metering disks or adjusts one or more thereof for a flow differing from that provided by the adjusted position of one or more of the other metering disks which, of course, is not desirable.

The present invention is directed to an improved liquid fertilizer distributing apparatus of the general type aforementioned including a source of liquid fertilizer preferably under a substantially constant pressure head and a plurality of spaced fertilizer distributing outlets, and is particularly characterized by means communicating the source of fertilizer to all of the distributing outlets and including a selectively adjustable metering mechanism to simultaneously adjustably vary substantially equally the rates of flow of fertilizer from the source thereof to the distributing outlets.

More specifically in this regard, the aforementioned source of liquid fertilizer preferably communicates with a manifold which includes vertically elongate outlet port means spaced below such source, and the metering mechanism comprises a plurality of inlet ports, such as a pair thereof, respectively connected to the distributing outlets and communicating with the outlet port means of the the manifold, and means vertically adjustably mounting the metering mechanism relative to the manifold to vertically adjust the inlet ports relative to the outlet port means to vary the pressure head of the fertilizer at the inlet ports relative to the source, and thereby substantially equally vary the rate of flow of fertilizer to the respective distributing outlets.

Still more specifically, the metering mechanism is further characterized by a selectively rotatably adjustable metering disk including a pair of opposed annular series of metering orifices of substantially identically progressively varying areas respectively disposed for movement between the aforementioned outlet port means and a pair of inlet ports respectively communicating with a pair of distributing outlets, whereby rotatable adjustment of the disk will simultaneously dispose orifices of the respective series thereof having substantially identical areas between the respective inlet ports and the outlet port means to substantially equally meter the flow of fertilizer therethrough at any given pressure head.

As a consequence of such construction, the rate of flow of the liquid fertilizer to a plurality of spaced distributing outlets may be varied simultaneously merely by adjusting a single metering mechanism while positively insuring that the rates of flow to each of the distributing outlets are always adjusted the same. In addition, a wider variation in the obtainable rates of flow is permitted since the pressure head acting upon the fertilizer may be varied in addition to the size of the metering orifice through which the fertilizer need flow.

In order to facilitate a further understanding of the present invention, reference will now be made to the drawings in which:

FIGURE 1 is a fragmentary partially schematic side elevational view of a planter hitched in towed relation behind an agricultural tractor, and illustrates a preferred embodiment of the invention;

FIGURE 2 is a fragmentary view, partially broken away and in section to illustrate certain details, taken on line 2—2 of FIGURE 1;

FIGURE 3 is an enlarged fragmentary sectional view taken on line 3—3 of FIGURE 2;

FIGURE 4 is a view taken generally on line 4—4 of FIGURE 3 while illustrating in phantom certain details of the construction in the plane behind the plane of the view; and FIGURE 5 is a sectional view taken generally along line 5—5 of FIGURE 4.

Referring now to the drawings, and particularly FIGURES 1 and 2 thereof, the invention has been illustrated as incorporated on an otherwise conventional two-row planter indicated fragmentarily and generally at 10, and of the type comprising a frame 12 adapted to be suitably hitched in a conventional manner, as through conventional draft linkage, in towed relationship to the rear of an agricultural tractor a portion of which, such as a rear fender, being illustrated fragmentarily and schematically at 14. The planter further includes frame members 16 extending from and below the planter frame 12 and respectively mounting a pair of transversely spaced disklike furrow openers 18 of conventional construction for engagement with the ground to be planted. A pair of seed bins will, of course, also be carried on the planter frame 12 in the usual manner to supply seed to be planted in the respective furrows, and the usual pair of laterally spaced press wheels will be suitably mounted on the planter frame in trailing relation to the respective furrow openers 18, such bins and wheels not being shown due to their conventional nature and in order not to obscure the invention. As will be apparent, the frame 12 may be equipped with conventional wheels so as to be self-transportable or the frame may be connected to the tractor in such a manner, as through the aforementioned conventional draft linkage, whereby the frame may be bodily lifted and lowered relative to the tractor and the ground.

The liquid fertilizer distributing apparatus of this invention is indicated generally at 20 in FIGURES 1 and 2, and comprises a conventional substantially air-tight tank 22 removably supported as by means of the straps 24 on spaced saddle members 26 respectively fixed to the upper ends of a pair of support brackets 28 suitably rigidly secured to and upstanding from the planter frame 12. A cap 30 is removably mountable in sealed relation over a filler opening in the top of the tank for the purpose of filling the latter with the liquid fertilizer. The airtight tank is preferably of the so-called "bottom-vented" type in that it comprises a hollow vent tube 32 having its upper end suitably fixed to and extending through the upper end of the tank for communication with atmosphere, and its lower end terminating adjacent the bottom of the tank so as to be normally submerged within the liquid fertilizer maintained at normal levels within the tank. Thus, the bottom of the airtight tank is vented to provide a substantially constant static pressure head on the liquid fertilizer beneath the horizontal plane of the bottom end of the vent tube irrespective of variation of liquid level thereabove as will be readily apparent to those acquainted with this art.

An axially elongate valve housing 34 has its upper end suitably secured to the bottom of the tank 22 to communicate with the interior of the latter through a flow opening 36 therein, while the lower end thereof is threadably or otherwise suitably sealingly secured to the upper end of a manifold indicated generally at 38 and including a flow passage or bore 40 therethrough having an annular valve seat 42 at the upper end thereof and axially aligned with the valve housing 34, and a gallery 44 surrounding the passage or bore 40. A sediment trap 46, such as a common mason jar, has its open upper end sealingly engaged with the lower end of the manifold in axial alignment with the flow passage 40, and is removably mounted in such sealed relation by means of a conventional U-shaped mounting bracket 48 the upper ends of which are removably received and held upon the manifold by fasteners 50. A suitable annular filter 52 is interposed between the sediment trap and the gallery 44 to filter liquid fertilizer flowing from the passage 40 into the trap 46 to the gallery 44.

A conventional control valve 54 is mounted for reciprocable movement within the valve housing 34 between a lowered closed position engaging the valve seat 42 as shown in FIGURE 3 and thereby preventing any flow of liquid fertilizer from the tank through the passage 40, and a raised open position wherein such flow is permitted under the aforementioned substantially constant pressure head. The spring 56 disposed within the housing 34 and having its ends respectively engaging the valve 54 and the bottom of the tank normally biases the valve to its closed position. The valve includes a fitting 58 connected to one end of a flexible cable 60 which extends entirely through the vent tube 32, over a suitable pulley 62 mounted on the top of the tank and has its other end connected through a spring which is stronger than the spring 56 to a chain or the like 64 the links of which are adjustably mountable in a suitable retaining bracket 66 carried by a portion of the vehicle 14 such as a rear fender thereof as aforementioned, to control movement of the valve 54 between its open and closed positions. While the aforementioned cable connection may be operated manually by the operator of the vehicle to control movement of the valve, preferably the chain 64 has a suitable link thereof removably fixedly mounted within the retaining bracket 66 as shown so that the cable connection is automatically operable to open and close the valve at the beginning and end, respectively, of a planting operation. For example, with a suitable link of the chain mounted in the retaining bracket as aforedescribed and the planter frame suitably connected to draft linkage for lifting and lowering movement thereof relative to a ground-engaging planting position, the valve is automatically moved to its open position upon lowering the planter frame and, conversely, is automatically closed upon lifting the planter frame from its planting position. The links of the chain are adjustably mounted on the retaining bracket to insure proper operation of the valve 54 during such lifting and lowering movement of the planter frame, while the spring connecting the cable 60 and chain 64 prevents damage to the valve and its associated operating connection as by extending in the event that the planter frame is lowered to an extent in which the valve 54 engages the bottom of the tank.

A metering mechanism is indicated generally at 68 and comprises an adapter plate 70 including a pair of spaced liquid inlet ports 72 communicating with a flat face 74 thereof and the nipples 76 projecting from the other face thereof adapted to be respectively connected to one end of a pair of flexible conduits or hoses 78, the other ends of which are suitably mounted in boots 80 suitably supported from the frame members 16 adjacent the respective furrow openers 18 so as to distribute liquid fertilizer adjacent thereto. An arrow 82 or other suitable indicating means is provided along the upper edge of the adapter plate for a purpose to appear hereinafter.

The metering mechanism further comprises a flat circular metering disk 84 preferably formed of a suitable sealing material and including a pair of spaced annular series of metering orifices 86 and 88, respectively, extending therethrough and arranged in end-to-end relationship. As will be apparent particularly from FIGURE 4, there are a suitable number of orifices, in this case ten being shown, in each series thereof having progressively identically varying areas. Moreover, the corresponding orifices in the respective series thereof having identical areas are disposed diametrically opposite to each other along the metering disk. A pair of annular series of numerals as shown in FIGURE 4 and running from one to ten corresponding to the number of orifices in each series thereof are respectively positioned about the periphery of the metering disk so that corresponding numerals are disposed diametrically opposite to each other and in alignment with paired orifices of equal areas of the respective series thereof. The paired numerals are so positioned on the disk relative to the respective series of orifices 86 and 88 and arrow 82 so as to cooperate with the latter to indicate the area of opposed orifices of the respective series thereof which are in communication at any given time with inlet ports 72 on the adapter plate. Thus, with the disk 84 assembled relative to adapter plate 70 as shown particularly in FIGURE 4 and in a manner to be further described, the arrow 84 on the adapter plate shown in phantom is rotatably offset 90° from the horizontal plane through inlet ports 72. Therefore, the respective series of numerals are likewise rotatably offset 90° relative to each pair of orifices 84 and 86 having equal areas which is to be designated by a given numeral of such series. Thus, since the series of numerals from one to ten preferably progressively indicate paired orifices of progressively increasing areas as illustrated in FIGURE 4, appearance of the numeral on opposite arrow 84 will indicate that orifices 86 and 88 having the smallest area are respectively communicating with inlet ports 72 and so on through the numeral ten and the paired orifices having the greatest area.

The manifold 38 further includes a head member 90 having a substantially flat mounting surface 92 including means such as rib members 94 defining a pair of spaced vertically elongate outlet ports 96 in fluid communication with the gallery 44 within the manifold. In addition, the head member further includes a vertically elongate mounting slot 98 disposed centrally between outlet ports 96 on mounting surface 92 and including an intermediate portion which is somewhat wider than the end portions thereof, such slot communicating with a cavity 100 in the manifold head member. A bolt or the like 102 includes a head 104 vertically adjustably slidably disposed within the cavity 100, and projects therefrom through mounting slot 98 and suitable central apertures within the metering disk 84 and the adapter plate 70 so as to receive a nut 106 thereon. The bolt head 104 is wider than the end portions of the mounting slot so as to be retained within cavity 100, while narrower than the intermediate portion thereof for installation purposes within the cavity. Thus, whether the bolt 102 is in the extreme upper position as illustrated in FIGURE 4 or the extreme lower position opposite thereto, it serves in conjunction with the nut 106 to vertically adjustably mount the entire metering mechanism 68 including the adapter plate 70 and metering disk 84 on the manifold relative to the outlet ports 96 while, upon releasing the nut 106 sufficiently, the metering disk 84 may be rotated about the axis of the bolt to rotate the metering orifices 86 and 88 relative to the outlet ports 96 on the manifold and the inlet ports 72 on the adapter plate.

At this juncture, it will be noted that, with the metering mechanism 68 assembled on the manifold head member 90 as illustrated in the drawings, the opposed float surfaces of the metering disk will tightly sealingly engage respectively the flat face 74 of the adapter plate and the mounting surface 92 of the manifold head member 90 to provide sealed communication between the manifold 38 and conduits or hoses 78 through the associated parts of the manifold, metering disk and adapter plate aforedescribed.

In operation, it may be assumed that a planting operation is taking place and that the valve 54 has been lifted from its seat 42 as previously described to allow liquid fertilizer to flow from the tank 22 through the opening 36 therein, valve housing 34, passage 40 into the sediment trap 46 and hence through the filter 52 to the gallery 44 and the outlet ports 96 communicating therewith. As will be appreciated, liquid fertilizer will completely fill the valve housing, sediment trap and manifold and will be available at any vertical height of the outlet ports 96 in the latter. Thus, with the metering mechanism 68 including the adapter plate 70 and metering disk 84 disposed in the position illustrated in FIGURE 4, liquid fertilizer may flow through the upper ends of the outlet ports 96, through paired, opposed metering orifices 86 and 88 of the respective series thereof having equal areas to the inlet ports 72 of the adapter plate and then to each of the conduits 78 for distribution immediately adjacent the spaced furrow openers 18. Due to the "bottomvented" construction of the airtight tank, a substantially constant pressure head will be imposed upon the fertilizer flowing to the conduits 78 through the metering mechanism 68 as determined essentially by the vertical distance between the lower end of the vent tube 32 and a horizontal plane through the inlet openings 72 on the adapter plate at any given adjusted height of the metering mechanism. Consequently, the rate of flow of liquid fertilizer through the respective conduits will be substantially equal for any selected pressure head and as determined by the equal areas of paired metering orifices 86 and 88 of a respective series thereof.

When it is desired to change any preselected rate of flow of liquid fertilizer through both of the conduits 78, the valve 54 is closed and the nut 106 may be loosened to permit manual rotation of the metering disk 84 about the axis of the bolt 102 to select a new set of opposed metering orifices from the respective series thereof for alignment with the respective outlet ports 96 and inlet ports 72, the proper positioning and sizes of such orifices being indicated by alignment of the proper numeral on the metering disk with the indicating arrow 82 on the adapter plate. At this time, the nut is retightened and the valve opened, and liquid fertilizer will again flow through both conduits at substantially equal rates. Consequently, substantially equal rates of flow can be provided through each of the conduits 78, and the flow rates can be varied simultaneously merely by rotatably adjusting the metering disk 84 thereby further assuring that the same rate of flow is selected for both conduits.

To provide even greater flexibility in selecting rates of flow for the liquid fertilizer, the metering mechanism 68 is vertically adjustable on the manifold to change the pressure head at the inlet ports 72 of the adapter plate relative to the bottom end of the vent tube 32. Thus, the valve 54 may be closed, and the nut 106 loosened to permit bodily shifting movement of the metering mechanism including the adapter plate 70 and metering disk 84 vertically downwardly from the position shown in FIGURE 4 to its extreme lowered position in which the bolt 102 is disposed in the narrow bottom portion of the mounting slot 98 corresponding to the upper portion as shown, and the inlet ports 72 and paired metering orifices 86 and 88 communicate respectively with the lower ends of the outlet ports 96 in the manifold head member. At this time, the nut may be retightened and the valve opened for flow of liquid fertilizer through the metering mechanism as aforedescribed. Therefore, by adjusting the metering mechanism in this manner, it will be obvious that the pressure head imposed at the inlet ports 72 would be relatively increased, thereby providing a different rate of flow through any selected pair of metering orifices than when the metering mechanism is in its uppermost position. Thus, in effect, instead of having merely ten preselected rates of flow available through each of the conduits 78 as determined by selection of any one of the ten metering orifices of each series thereof, twenty such rates of flow are available merely by adjusting the metering mechanism between its two vertical positions as aforedescribed to vary the pressure head of the liquid fertilizer flowing through the metering mechanism and, as will be readily apparent, if desired, the metering mechanism may be adapted for infinitely fine adjustment between the extreme upper and lower positions thereof to provide an infinite number of rates of flow within predetermined limits.

The embodiments of the invention in which an exclusive property or privilege is claimed are defined as follows:

1. In a liquid fertilizer distributing apparatus of the type including a source of liquid fertilizer, means to provide a substantially constant pressure head and a plurality of spaced fertilizer distributing outlets; the improvement comprising means communicating said source with said distributing outlets and including a single metering means disposed below said source, and means to vertically adjust said metering means relative to said source to vary the pressure head of fertilizer metered therefrom to said distributing outlets.

2. In a liquid fertilizer distributing apparatus of the type including a source of liquid fertilizer under a substantially constant pressure head and a plurality of spaced fertilizer distributing outlets; the improvement comprising a manifold communicating with said source and including vertically elongate outlet port means spaced below said source, a metering mechanism including a plurality of inlet ports respectively communicating with said distributing outlets and said outlet port means, and means vertically adjustably mounting said metering mechanism relative to said manifold to vertically adjust said inlet ports relative to said outlet port means to vary the pressure head of the fertilizer at said inlet ports.

3. In a liquid fertilizer distributing apparatus of the type including a source of liquid fertilizer under a substantially constant pressure head and a pair of spaced fertilizer distributing outlets; the improvement comprising a manifold communicating with said source and including vertically elongate outlet port means spaced below said source, a metering mechanism including a pair of inlet ports respectively connected to said distributing outlets and communicating with said outlet port means, and means vertically adjustably mounting said metering mechanism relative to said manifold to vertically adjust said inlet ports relative to said outlet port means to vary the pressure head of the fertilizer at said inlet ports.

4. The apparatus according to claim 3 wherein said means vertically adjustably mounting said metering mechanism comprises a vertically elongate slot within said manifold and fastener means vertically adjustably mounted within said slot and connecting said metering mechanism to said manifold.

5. In a liquid fertilizer distributing apparatus of the type including a source of liquid fertilizer under a substantially constant pressure head and a plurality of spaced fertilizer distributing outlets; the improvement comprising a manifold communicating with said source and including outlet port means, a metering mechanism including a plurality of inlet ports respectively connected to said distributing outlets and communicating with said outlet port means, and selectively adjustable metering means including a plurality of series of metering orifices of substantially identically varying areas respectively movable between said respective inlet ports and outlet port means, whereby adjustment of said metering means simultaneously disposes orifices of said respective series thereof having substantially identical areas between said respective inlet ports and said outlet port means to substantially equally meter the flow of fertilizer therethrough.

6. In a liquid fertilizer distributing apparatus of the type including a source of liquid fertilizer under a substantially constant pressure head and a pair of spaced fertilizer distributing outlets; the improvement comprising a manifold communicating with said source and including outlet port means, a metering mechanism including a pair of inlet ports respectively connected to said distributing outlets and communicating with said outlet port means, and a selectively rotatably adjustable metering disk including a pair of opposed annular series of metering orifices of substantially identically varying areas respectively movable between said respective inlet ports and outlet port means, whereby rotatable adjustment of said disk simultaneously disposes orifices of said respective series thereof having substantially identical areas between said respective inlet ports and said outlet port means to substantially equally meter the flow of fertilizer therethrough.

7. In a liquid fertilizer distributing apparatus of the type including a source of liquid fertilizer under a substantially constant pressure head and a pair of spaced fertilizer distributing outlets; the improvement comprising a manifold communicating with said source and including outlet port means, metering mechanism including a pair of inlet ports respectively connected to said distributing outlets and communicating with said outlet port means, and a selectively rotatably adjustable metering disk including a pair of annular series of metering orifices respectively movable between said respective inlet ports and said outlet port means, the orifices of each series thereof having substantially identically varying areas with orifices of said respective series having substantially identical areas being disposed substantially opposite to each other, whereby rotatable adjustment of said disk simultaneously disposes orifices of said respective series thereof having substantially identical areas between said respective inlet ports and said outlet port means to substantially equally meter the flow of fertilizer therethrough.

8. In a liquid fertilizer distributing apparatus of the type including a source of liquid fertilizer under a substantially constant pressure head and a pair of spaced fertilizer distributing outlets; the improvement comprising a manifold communicating with said source and including vertically elongate outlet port means spaced below said source, a metering mechanism including a pair of spaced inlet ports respectively connected to said distributing outlets and communicating with said outlet port means, a selectively rotatably adjustable metering disk including a pair of annular series of metering orifices respectively movable between said respective inlet ports and said outlet port means, the orifices of each series thereof having substantially identically progressively varying areas with orifices of said respective series having substantially identical areas being disposed substantially opposite to each other, whereby rotatable adjustment of said disk simultaneously disposes orifices of said respective series having substantially identical areas between said respective inlet ports and said outlet port means to substantially equally meter the flow of fertilizer therethrough, and means vertically adjustably mounting said metering mechanism including said disk relative to said manifold to adjust said inlet ports relative to said outlet port means to vary the pressure head of the fertilizer at said inlet ports.

9. The apparatus according to claim 8 wherein said means vertically adjustably mounting said metering mechanism comprises a vertically elongate slot within said manifold substantially centrally of said outlet port means, and fastener means vertically adjustably mounted within said slot and connecting said metering mechanism to said manifold, said disk being rotatably mounted about said fastener means.

10. In a liquid fertilizer distributing apparatus of the type including a source of liquid fertilizer under a substantially constant pressure head and a pair of spaced fertilizer distributing outlets; the improvement comprising a manifold communicating with said source and including vertically elongate outlet port means spaced below said source, a metering mechanism including an adapter plate having a pair of inlet ports, a pair of flexible conduit means respectively connecting said inlet ports to said distributing outlets, means vertically adjustably mounting said adapter plate relative to said manifold to vertically adjust said inet ports relative to said outlet port means to vary the pressure head of the fertilizer at said inlet ports, and a metering disk selectively rotatably adjustable relative to said adapter plate and vertically therewith and including a pair of annular series of metering orifices respectively movable between said inlet ports and said outlet port means, the orifices of each series thereof having substantially identically progressively varying areas with orifices of said respective series having substantially identical areas being disposed substantially opposite to each other, whereby rotatable adjustment of said disk simultaneously disposes orifices of said respective series having substantially identical areas between said respective inlets ports and said outlet port means to substantially equally meter the flow of fertilizer therethrough.

11. In a liquid fertilizer distributing apparatus of the type including a source of liquid fertilizer under a substantially constant pressure head and a pair of spaced fertilizer distributing outlets; the improvement comprising a manifold communicating with said source and including vertically elongate outlet port means spaced below said source, a metering mechanism including an adapter plate having a pair of inlet ports, a pair of flexible conduit means respectively connecting said inlet ports to said distributing outlets, a vertically elongate mounting slot in said manifold substantially centrally of said outlet port means, fastener means vertically adjustably mounting within said slot and extending through said adapter plate to vertically adjustably mount the latter relative to said outlet port means to vary the pressure head of the fertilizer at said inlet ports, a metering disk selectively rotatably adjustable about said fastener means and vertically therewith and including a pair of opposed annular series of metering orifices respectively movable between said inlet ports and said outlet port means, the orifices of each series thereof having substantially identically progressively varying areas with orifices of said respective series having substantially identical areas being disposed substantially opposite to each other, whereby rotatable adjustment of said disk simultaneously disposes orifices of said respective series having substantially identical areas between said respective inlet ports and said outlet port means to substantially equally meter the flow of fertilizer therethrough.

12. The apparatus according to claim 11 further comprising control valve means selectively operable to control the flow of fertilizer from said source to said manifold.

13. In a liquid fertilizer distributing apparatus of the type including a source of liquid fertilizer, means to provide a substantially constant pressure head and a fertilizer distributing outlet; the improvement comprising means including orifice means communicating said source with said distributing outlet, and means for selectively adjusting said orifice means relative to said source to vary the pressure head of fertilizer metered therefrom through said orifice means to said distributing outlet.

14. In a liquid fertilizer distributing apparatus of the type including a source of liquid fertilizer, means to provide a substantially constant pressure head and a plurality of fertilizer distributing outlets; the improvement comprising means including a plurality of orifice means respectively communicating said source with said distributing outlets, and means adjustably mounting said orifice means relative to said source to vary substantially equally the pressure head of fertilizer at said orifice means to thereby substantially simultaneously adjust the rate of flow of fertilizer from said source through said orifice means to said respective distributing outlets.

15. In a liquid fertilizer distributing apparatus of the type including a source of liquid fertilizer under a substantially constant pressure head and a plurality of fertilizer distributing outlets; the improvement comprising means communicating said source with said distributing outlets and including selectively adjustable metering means including a plurality of series of metering orifices of varying areas, said metering means being selectively adjustable to dispose orifices of said respective series thereof having identical areas in position for flow of fertilizer therethrough from said source to said respective distributing outlets to substantially simultaneously and equally adjust the rate of flow of fertilizer to said outlets, and means mounting said metering means for adjustment relative to said source to vary the pressure head of fertilizer at said orifice means and to substantially simultaneously and equally adjust the rate of flow of fertilizer therethrough to said distributing outlets.

16. In a liquid fertilizer distributing apparatus of the type including a source of liquid fertilizer under a substantially constant pressure head and a plurality of fertilizer distributing outlets; the improvement comprising means communicating said source with said distributing outlets and including metering means defining a plurality of flow areas controlling the rate of flow of fertilizer to said respective distributing outlets, said metering means being selectively adjustable to substantially simultaneously and equally vary said flow areas and the rate of flow of fertilizer therethrough, and means mounting said metering means for adjustment relative to said source to vary the pressure head of fertilizer supplied therefrom and to substantially simultaneously and equally adjust the rate of flow of fertilizer from said source to said distributing outlets independently of variation of said flow areas.

17. In a liquid fertilizer distributing apparatus of the type including a source of liquid fertilizer under a substantially constant pressure head and a plurality of fertilizer distributing outlets; the improvement comprising means communicating said source with said distributing outlets and including a metering mechanism, said metering mechanism including a plurality of inlets respectively communicating with said distributing outlets and selectively adjustable metering means including a plurality of series of metering orifices of substantially identically varying areas respectively movable into the flow path of fertilizer through said inlets to said outlets to substantially simultaneously and equally adjust the rate of flow of fertilizer to said outlets, and means selectively adjustably mounting said metering mechanism including said metering means relative to said source to vary the pressure head of fertilizer at said inlets to substantially simultaneously and equally vary the rate of flow to said outlets independently of adjustment of said orifice means.

References Cited by the Examiner

UNITED STATES PATENTS

| 2,698,114 | 12/54 | Buhr | 222—486 X |
| 2,950,737 | 8/60 | Hendrix | 222—485 X |
| 3,003,775 | 10/61 | Ackley | 222—129 X |

LOUIS J. DEMBO, *Primary Examiner.*

RAPHAEL M. LUPO, *Examiner.*